(12) United States Patent
Shinkai

(10) Patent No.: US 8,292,415 B2
(45) Date of Patent: Oct. 23, 2012

(54) LIQUID COLUMN MEMBER OF LIQUID TANK, LIQUID TANK, AND DROPLET DISCHARGE DEVICE

(75) Inventor: Katsumi Shinkai, Fujimi-machi (JP)

(73) Assignee: Seiko Epson Corporation, Tokyo (JP)

( * ) Notice: Subject to any disclaimer, the term of this patent is extended or adjusted under 35 U.S.C. 154(b) by 444 days.

(21) Appl. No.: 12/716,705

(22) Filed: Mar. 3, 2010

(65) Prior Publication Data

US 2010/0238239 A1    Sep. 23, 2010

(30) Foreign Application Priority Data

Mar. 18, 2009    (JP) ................................. 2009-066368

(51) Int. Cl.
*B41J 2/175*    (2006.01)
(52) U.S. Cl. ........................................................ 347/85
(58) Field of Classification Search .................... 347/84, 347/85, 86, 87, 7
See application file for complete search history.

(56) References Cited

U.S. PATENT DOCUMENTS

| | | | |
|---|---|---|---|
| 2004/0189756 A1* | 9/2004 | Ikezaki et al. | 347/86 |
| 2007/0291088 A1* | 12/2007 | Katayama et al. | 347/86 |
| 2009/0141095 A1* | 6/2009 | Umeda | 347/85 |
| 2009/0262153 A1* | 10/2009 | Tamaki et al. | 347/7 |

FOREIGN PATENT DOCUMENTS

JP    2008-238125 A    10/2008

* cited by examiner

*Primary Examiner* — Kristal Feggins
(74) *Attorney, Agent, or Firm* — Global IP Counselors, LLP

(57) ABSTRACT

A liquid column member of a liquid tank is adapted to be coupled to a tank body of the liquid tank and to face a photosensor that detects a liquid level in the tank body. The liquid column member includes a pipe body and a liquid guide portion. The pipe body is made of light transmissive material. The pipe body has a liquid repellent internal surface. The liquid guide portion is configured and arranged to guide a droplet that slips down along the internal surface of the pipe body away from a sensing position of the photosensor.

7 Claims, 9 Drawing Sheets

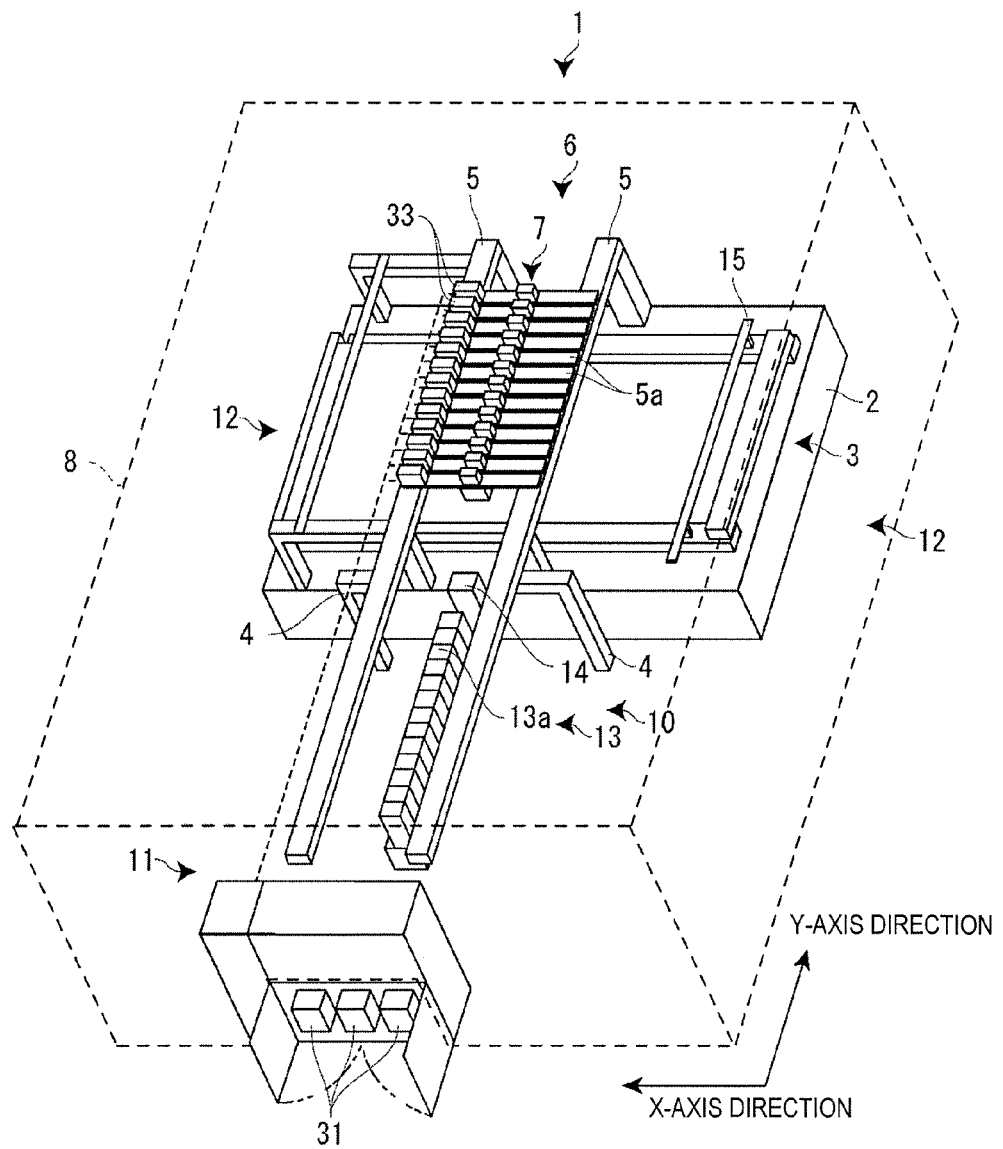
F I G. 1

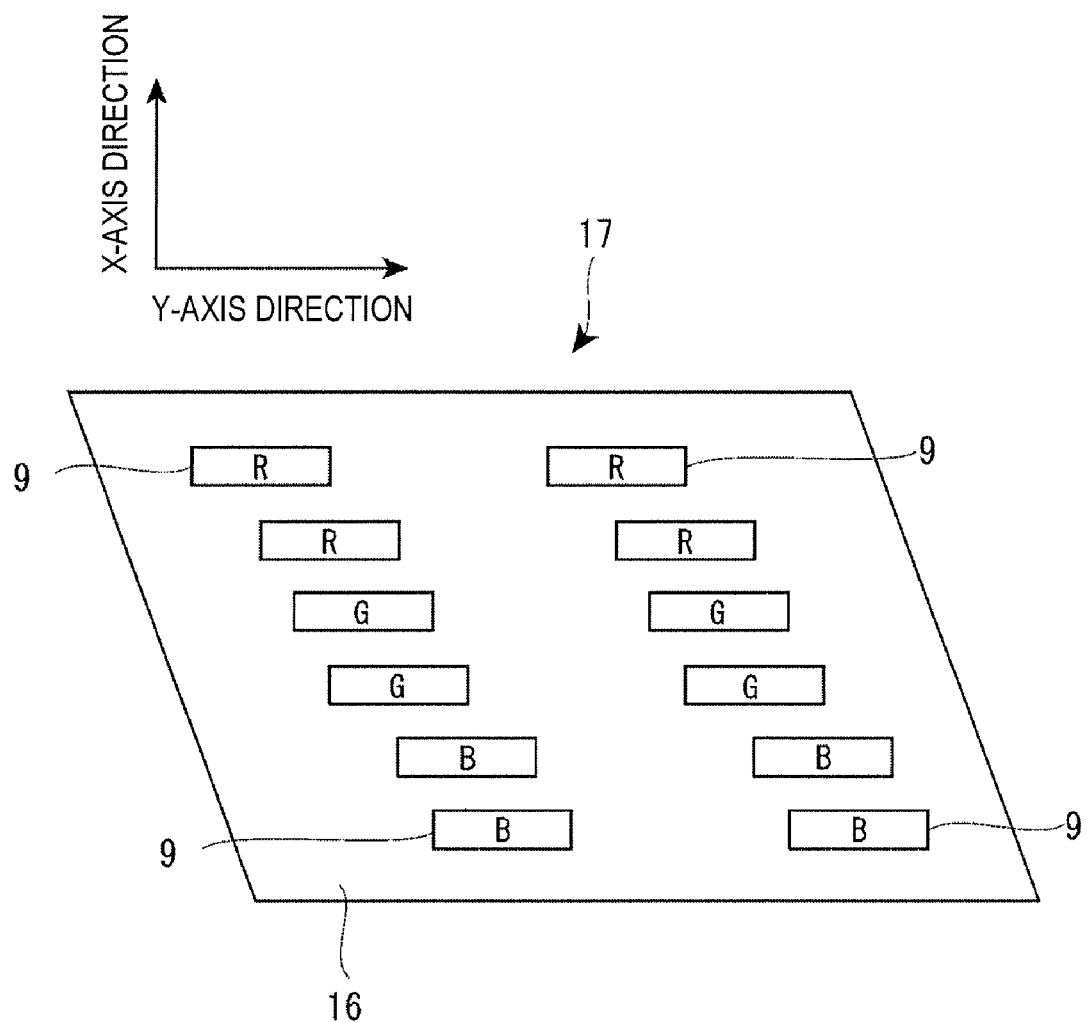
F I G. 2

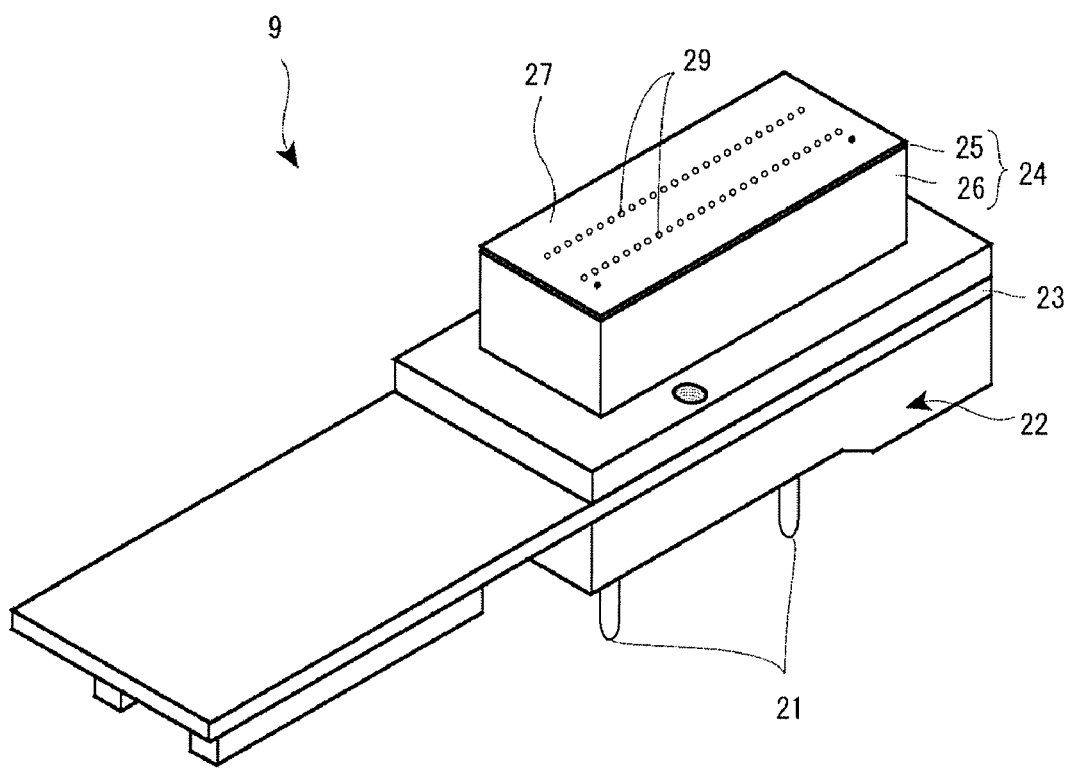
F I G. 3

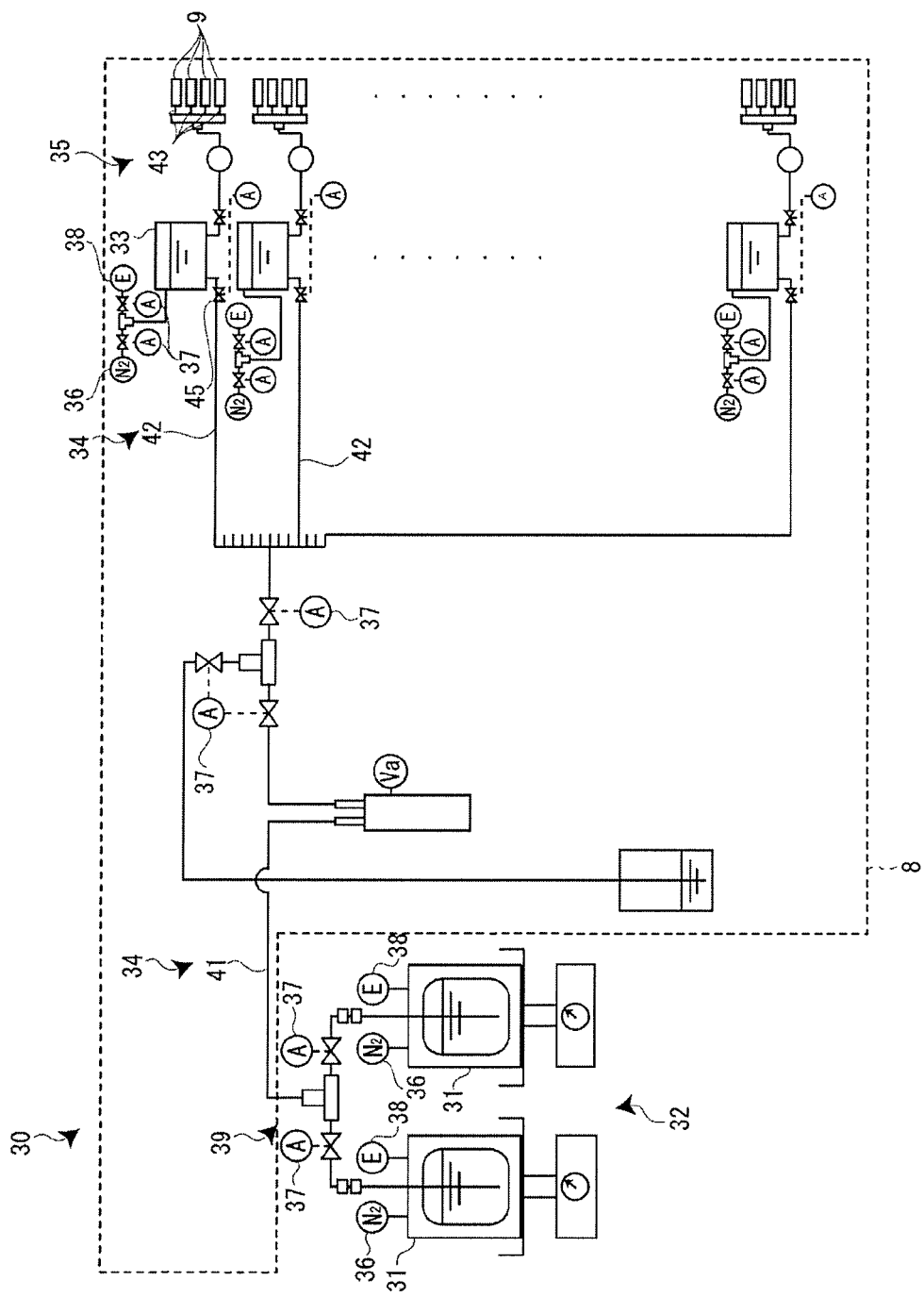
F I G. 4

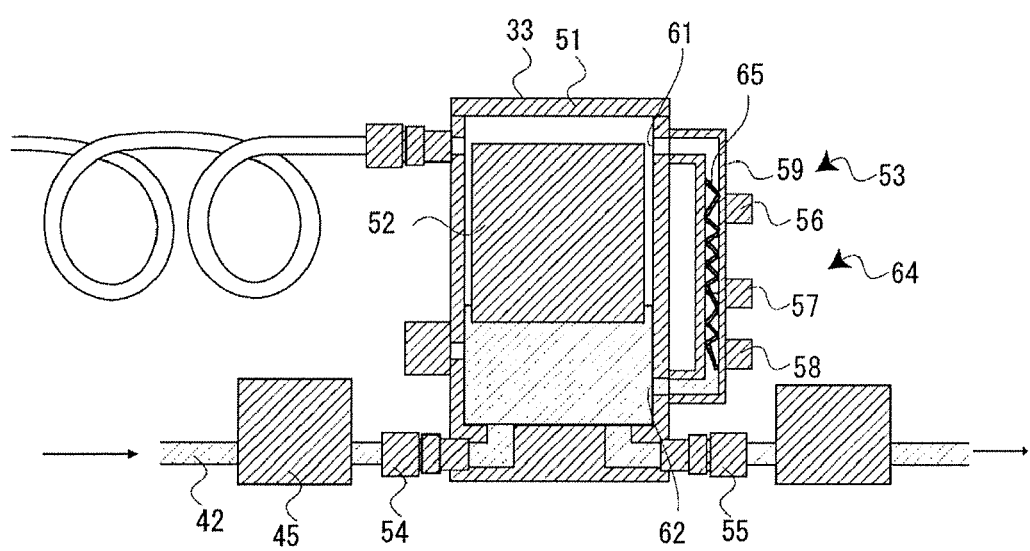
F I G. 5

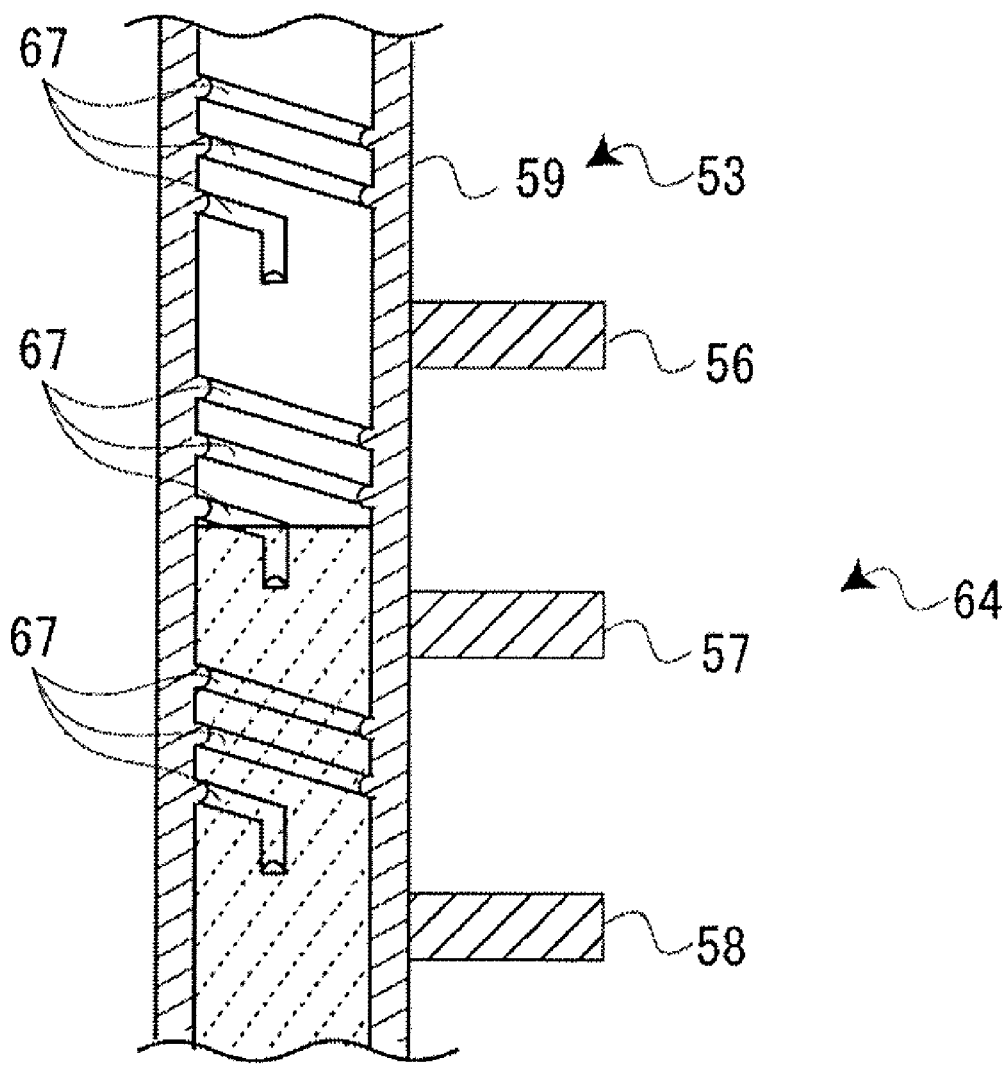
F I G. 9

LIQUID COLUMN MEMBER OF LIQUID TANK, LIQUID TANK, AND DROPLET DISCHARGE DEVICE

CROSS-REFERENCE TO RELATED APPLICATIONS

This application claims priority to Japanese Patent Application No. 2009-066368 filed on Mar. 18, 2009. The entire disclosure of Japanese Patent Application No. 2009-066368 is hereby incorporated herein by reference.

BACKGROUND

1. Technical Field

The present invention relates to a liquid column member of a liquid tank, the liquid column member of a liquid tank being attached to a tank body and faced by a photosensor for sensing the liquid level of the tank body, to a liquid tank, and to a droplet discharge device.

2. Related Art

A conventional droplet discharge device that is provided with a sub tank (liquid tank) for storing a functional liquid that is fed to a functional droplet discharge head, and a liquid column pipe (liquid column member) provided with a liquid level detecting means for detecting the liquid level of the functional liquid stored in the sub tank is known as a droplet discharge device that is provided with the type of liquid column member and liquid tank described above (see Japanese Laid-Open Patent Publication No. 2008-238125). The functional liquid is force-fed from a main tank to the sub tank, and a valve provided in front of the sub tank is opened, whereby the functional liquid is supplied to the sub tank. The liquid level detecting means has an upper-limit sensor and a lower-limit sensor, and by maintaining the level of the functional liquid in the sub tank between these two sensors, the hydraulic head pressure value is maintained with respect to the droplet discharge head, and the discharged quantity is stabilized.

SUMMARY

A photosensor is usually used in the liquid level detecting means described above. The photosensor includes a light-emitting element and a light-receiving element, and uses the characteristics of the light (the refractive index of light at the sensing position) to sense the liquid level. Specifically, the light-receiving element receives the light emitted by the light-emitting element when the sensing position of the photosensor is in air, but when the sensing position is in the liquid, the light emitted by the light-emitting element is radiated into the liquid, and since the refractive index of the light is different, the light-receiving element does not receive the light. The presence of liquid; i.e., the liquid level, is sensed by this change in the output of the light-receiving element.

However, since the internal surface of the liquid column pipe attached to the sub tank in the conventional droplet discharge device described above is liquid repellent, the adhering liquid readily forms a droplet. When this droplet adheres at the sensing position of the photosensor, the contact angle of the adhering droplet with the internal surface of the liquid column pipe is large, thereby changing the refractive index of light from the light-emitting element, and the droplet can be mistakenly sensed as the liquid level. Detection errors can therefore occur in liquid level detection.

An object of the present invention is to provide a liquid column member of a liquid tank, a liquid tank, and a droplet discharge device in which erroneous detection by a photosensor does not occur in the liquid column member attached to the liquid tank.

A liquid column member of a liquid tank according to a first aspect is adapted to be coupled to a tank body of the liquid tank and to face a photosensor that detects a liquid level in the tank body. The liquid column member includes a pipe body and a liquid guide portion. The pipe body is made of light transmissive material. The pipe body has a liquid repellent internal surface. The liquid guide portion is configured and arranged to guide a droplet that slips down along the internal surface of the pipe body away from a sensing position of the photosensor.

The liquid guide portion preferably comprises a groove portion that is formed in the internal surface so as to extend at a liquid-guiding inclination. Alternatively, the liquid guide portion preferably comprises a protruding portion that is formed on the internal surface so as to extend at a liquid-guiding incline.

Alternatively, the liquid guide portion preferably comprises a wire member that is attached to the internal surface so as to extend at a liquid-guiding incline. In this case, the internal surface is preferably cylindrical, and the wire member preferably comprises a coil spring member.

Through these configurations, since the liquid in the form of a droplet flows downward along the liquid guide portion in the internal surface of the liquid column member, the droplet can be prevented from adhering in the sensing position of the photosensor. Since the refractive index of the light at the sensing position thereby has no effect, the liquid level can be accurately sensed without detection error occurring. The amount of liquid stored in the liquid tank can therefore be accurately monitored, and the liquid level can be appropriately managed. The liquid column member may also be a so-called liquid column pipe that is attached to the outside of the tank body, or may be a window formed in the tank body.

The liquid tank of another aspect includes the liquid column member of a liquid tank, a tank body, and a photosensor for facing the liquid column member.

Through this configuration, the level of liquid inside the liquid tank can be accurately sensed without errors in detection by the photosensor. The amount of liquid in the liquid tank can thereby be appropriately maintained.

The droplet discharge device of another aspect includes a drawing unit configured and arranged to move an inkjet-type functional droplet discharge head relative to a workpiece, during which time droplets of a functional liquid are discharged from the functional droplet discharge head to the workpiece, so that drawing is performed; and the abovementioned liquid tank configured and arranged to store the functional liquid and to feed the functional liquid at the natural hydraulic head to the droplet discharge head.

Through this configuration, the photosensor can be prevented from detecting an erroneous liquid level of the liquid tank, and the liquid level of the liquid tank can be managed at the appropriate height. The hydraulic head pressure value of the droplet discharge head can thereby be stably maintained.

BRIEF DESCRIPTION OF THE DRAWINGS

Referring now to the attached drawings which form a part of this original disclosure:

FIG. 1 is a perspective view showing the droplet discharge device;

FIG. 2 is a schematic plan view showing the head unit;

FIG. 3 is a schematic plan view showing the droplet discharge head;

FIG. 4 is a view showing the duct system of the functional liquid feeding device;

FIG. 5 is a schematic sectional view showing the area of the sub tank;

FIG. 9 is a schematic sectional view showing the liquid column pipe according to a third embodiment.

DETAILED DESCRIPTION OF EXEMPLARY EMBODIMENTS

Figure 6:
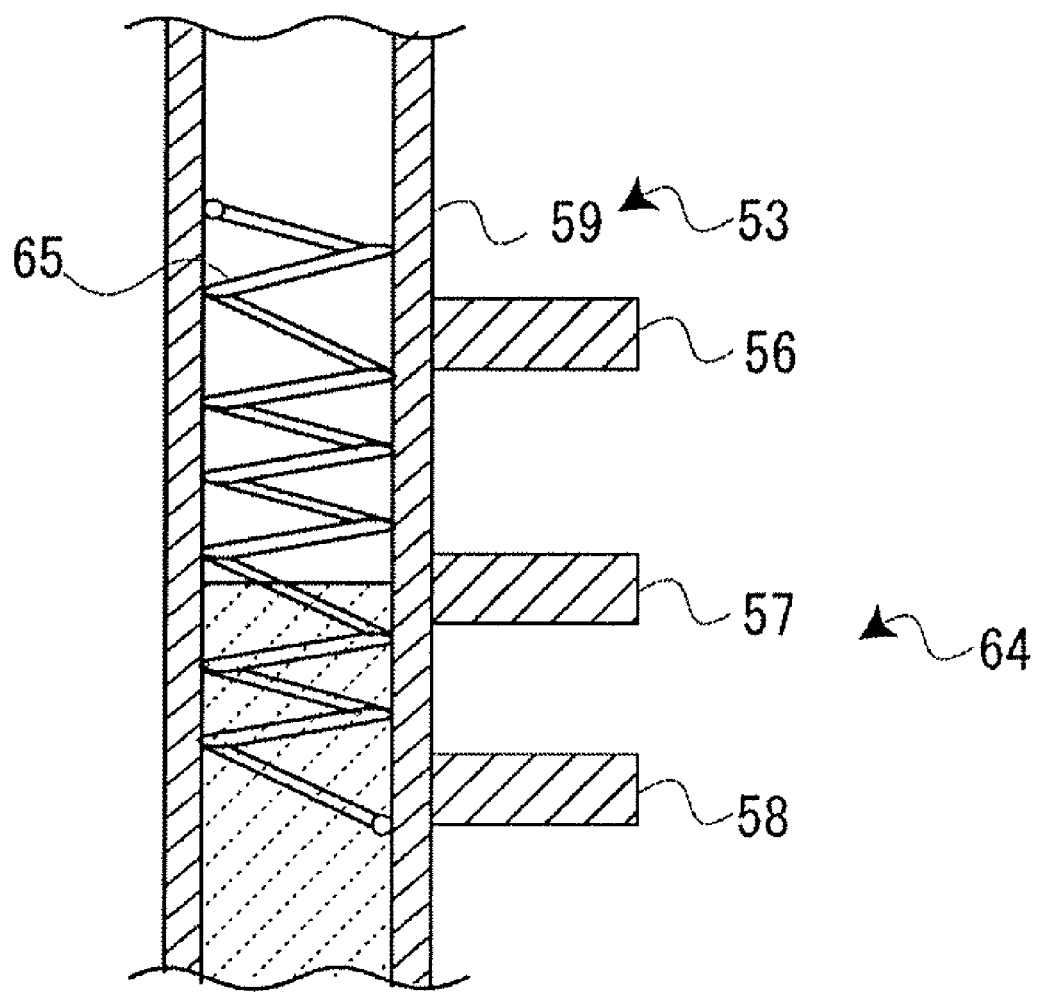
FIG. 6 is a schematic sectional view showing the liquid column pipe according to a first embodiment.

A droplet discharge device that uses a liquid tank provided with a liquid column member according to the present invention will be described with reference to the accompanying drawings. This droplet discharge device is incorporated into a flat-panel display manufacturing line and uses a functional droplet discharge head into which a specialized ink or luminescent resin liquid is introduced as a functional liquid, and the droplet discharge device forms color filters of a liquid crystal display device or luminescent elements or the like as pixels of an organic EL display.

As shown in FIG. 1, the droplet discharge device 1 includes a drawing unit having an X-axis table 3 for moving a workpiece in the X-axis direction (primary scanning direction), the X-axis table 3 extending in the X-axis direction as the primary scanning direction and being provided on an X-axis support base 2 supported by a hard surface; a Y-axis table 6 extending in the Y-axis direction as a secondary scanning direction and being provided on a pair of Y-axis support bases 5 that are suspended over the X-axis table 3 via a plurality of support columns 4; and thirteen carriage units 7 in which a plurality of functional droplet discharge heads 9 (see FIG. 2) is mounted; and the thirteen carriage units 7 are suspended by the Y-axis table 6. The droplet discharge device 1 is further provided with a chamber 8 for housing the abovementioned devices in a temperature- and humidity-controlled atmosphere, and a functional liquid feeding unit 11 running through the chamber 8 that has three functional liquid feeding devices 30 (see FIG. 4) for feeding functional liquid to the functional droplet discharge heads 9 inside from outside the chamber 8. By driving the discharge of the functional droplet discharge heads 9 synchronously with the driving of the X-axis table 3 and the Y-axis table 6, RGB tricolor functional droplets fed from the functional liquid feeding unit 11 are discharged, and a predetermined drawing pattern is drawn on the workpiece.

The droplet discharge device 1 is also provided with a maintenance device 10 that has a flushing unit 12, a suction unit 13, a wiping unit 14, and a discharge performance detection unit 15. These units are provided to maintain the functional droplet discharge heads 9 and enable the functioning of the functional droplet discharge heads 9 to be maintained and restored.

The flushing unit 12 receives reserve discharge (flushing) of the functional droplet discharge heads 9 that is performed immediately prior to discharge by the functional droplet discharge heads 9, during replacement of the workpiece, and at other times at which drawing is suspended. The wiping unit 14 has a wiping sheet and wipes a nozzle surface 27 of the functional droplet discharge heads 9 after suction. The discharge performance detection unit 15 detects the discharge performance (flight deflection and presence of discharge) of the functional droplet discharge heads 9 by image recognition of the functional droplets discharged from the functional droplet discharge heads 9. The suction unit 13 has a plurality of divided suction units 13a, and forcibly suctions the functional liquid from discharge nozzles 29 of the functional droplet discharge heads 9 and serves as a cap.

Each of the carriage units 7 is provided with a head unit 17 having twelve functional droplet discharge heads 9 and a carriage plate 16 for supporting the twelve functional droplet discharge heads 9 in two groups of six heads each (see FIG. 2). Each of the carriage units 7 is suspended from a bridge plate 5a suspended on the pair of Y-axis support bases 5. The carriage units 7 are configured so that functional liquid is fed to the functional droplet discharge heads 9 using the natural hydraulic head pressure from sub tanks (liquid tanks) 33 that are provided on the bridge plates 5a. The number of carriage units 7 is arbitrary, as well as the number of functional droplet discharge heads 9 mounted in each of the carriage units 7.

As shown in FIG. 3, the functional droplet discharge head 9 is a so-called double inkjet head, and is provided with a functional liquid introduction part 22 having two connecting pins 21; a double head substrate 23 that is connected to the side of the functional liquid introduction part 22; and a head body 24 filled with functional liquid and connected to the bottom of the head substrate 23. The connecting pins 21 are connected to the functional liquid feeding unit 11, and feed functional liquid to the functional liquid introduction part 22. The head body 24 includes a cavity 26 (piezoelectric element) and a nozzle plate 25 having a nozzle surface 27 in which numerous discharge nozzles 29 are formed. When the functional droplet discharge head 9 is driven, functional droplets are discharged from the discharge nozzles 29 by the pumping action of the cavity 26.

The functional liquid feeding unit 11 is provided with three functional liquid feeding devices 30 that correspond to the three colors R, G, and B. As shown in FIG. 4, each of the functional liquid feeding devices 30 is provided with a tank unit 32 having two main tanks 31, 31 that constitute sources from which the functional liquid is fed; thirteen (a plurality of) sub tanks (liquid tanks) 33 provided so as to correspond to the carriage units 7; functional liquid flow channels 34 for connecting the tank unit 32 and the thirteen sub tanks 33; and thirteen downstream functional liquid flow channels 35 for connecting the sub tanks 33 and the functional droplet discharge heads 9. The three functional liquid feeding devices 30 are each connected to a functional droplet discharge head 9 that corresponds to one of the three colors R, G, and B, and the corresponding color of functional liquid is thereby fed to each functional droplet discharge head 9.

The functional liquid in the main tanks 31 is pressurized by compressed nitrogen gas from nitrogen gas feeding equipment 36 connected to the main tanks 31, and is selectively fed to the thirteen sub tanks 33 via the functional liquid flow channels 34. The opening and closing of various opening and closing valves is then controlled by compressed air from compressed air feeding equipment 37. At the same time, the sub tanks 33 are opened to the atmosphere via gas exhaust equipment 38, and receive the necessary amount of functional liquid. The functional liquid of the sub tanks 33 is fed to the functional droplet discharge heads 9 via the downstream functional liquid flow channels 35 while being maintained at a predetermined hydraulic head pressure by the driving of the connected functional droplet discharge heads 9. In the present embodiment, thirteen carriage units 7 and thirteen corresponding sub tanks 33 are mounted, but the number of carriage units 7 and sub tanks 33 is arbitrary.

The tank unit 32 is provided with a pair of main tanks 31, 31 as functional liquid feeding sources, and a switching mechanism 39 for switching the pair of main tanks 31, 31, the switching mechanism 39 being connected to the pair of main tanks 31, 31 and connected to the functional liquid flow channels 34. The main tanks 31 are switchably connected to the nitrogen gas feeding equipment 36 and the gas exhaust equipment 38, and are configured so as to be capable of pressure control when functional liquid is force-fed, and negative pressure control (corresponding to opening to the atmosphere) when the functional liquid is back-fed.

The functional liquid flow channels 34 include a main functional liquid flow channel 41, the upstream end of which is connected to the tank unit 32; and a thirteen-branch flow channel 42 connected to the downstream end of the main functional liquid flow channel 41 and connected to the sub tanks 33. The downstream functional liquid flow channels 35 include individual functional liquid flow channels 43, the upstream ends of which are connected to the sub tanks 33, and the downstream ends of which are connected to the functional droplet discharge heads 9. A third opening and closing valve 45 positioned in the vicinity of each sub tank 33 is also provided in each of the thirteen branch flow channels 42.

The sub tank (liquid tank) 33 according to a first embodiment will be described in detail with reference to FIG. 5. The sub tank 33 is provided with a sub tank body (tank body) 51 for storing functional liquid; a lid float 52 that floats like a drop-lid in the sub tank body 51; a liquid column pipe (liquid column member) 53 (described in detail hereinafter) provided beside the sub tank body 51; and a liquid level detection mechanism 64, facing the liquid column pipe 53, for detecting the liquid level of the stored functional liquid. An inflow joint 54 connected to the thirteen-branch flow channel 42, and an outflow joint 55 connected to the individual functional liquid flow channels 43 are provided under the sub tank 33, and a configuration is adopted whereby the functional liquid flows in from under the sub tank body 51 and flows out from under the sub tank body 51. The nitrogen gas feeding equipment 36 and the gas exhaust equipment 38 are connected at the top of the sub tank body 51 (see FIG. 4), and the inside of the sub tank body 51 is configured so that it is possible to control pressurization of the main tanks 31 and opening to the atmosphere when liquid is force-fed from the main tanks 31.

The liquid level detection mechanism 64 adjacent to the liquid column pipe 53 described hereinafter is provided with an upper-limit detection sensor 56 for detecting the liquid level of the functional liquid at an upper limit; a liquid level detection sensor 57 for detecting the liquid level of the functional liquid during replenishing, the liquid level detection sensor 57 being provided in an intermediate position between the top and bottom; and a lower-limit detection sensor 58 for detecting the liquid level of the functional liquid at a lower limit. The upper-limit detection sensor 56 is provided to prevent the sub tank 33 from overflowing, and when the upper-limit detection sensor 56 detects a liquid level at the upper limit, the replenishment of liquid from the main tanks 31 is stopped. The lower-limit detection sensor 58 is provided to prevent the sub tank 33 from becoming empty, and when the lower-limit detection sensor 58 detects a liquid level at the lower limit, the droplet discharge device 1 is stopped when drawing on the current workpiece is completed.

The liquid level detection sensor 57 detects a liquid level that takes into account the ideal hydraulic head pressure of the functional droplet discharge head 9, and when the liquid level of the functional liquid is detected by the liquid level detection sensor 57, a determination is made in cooperation with a control unit (not shown in the drawing) as to whether the liquid level is full or low. Specifically, the amount of functional liquid is decreased by discharge operation from a state in which the liquid level is higher than the liquid level detection sensor 57, and a determination that the liquid level is low is made as a result of detection of the liquid level by the liquid level detection sensor 57. The amount of functional liquid is increased by a replenishment operation from a state in which the liquid level is lower than the liquid level detection sensor 57, and a determination is made that the liquid level will be full a certain period of time after the liquid level is detected by the liquid level detection sensor 57. Through such a liquid level detection sensor 57, the liquid level of functional liquid in the sub tank 33 can be controlled to an intermediate position between the top and bottom.

The operation whereby the functional liquid of the sub tank 33 is replenished from the main tanks 31 as functional liquid feeding sources will next be described. When the amount of functional liquid in the sub tank 33 decreases to a certain amount, and a determination is made by the abovementioned liquid level detection mechanism 64 that the liquid level is low, the third opening and closing valve 45 is opened, the gas exhaust equipment 38 is driven, and functional liquid is supplied to the sub tank 33 from the main tanks 31. Since the main tanks 31 are pressurized, the functional liquid of the main tanks 31 is automatically force-fed into the sub tank 33 by opening the third opening and closing valve 45 to open the inside of the sub tank 33 to the atmosphere. When the amount of functional liquid stored in the sub tank 33 increases to a certain amount, and a determination is made by the liquid level detection mechanism 64 that the liquid level in the sub tank 33 is full, the third opening and closing valve 45 is closed and the replenishment operation is completed.

The liquid level of the functional liquid in the sub tank 33 is thereby controlled to an intermediate position between the top and bottom by the liquid level detection sensor 57 and the control unit. Controlling the liquid level of the functional liquid to an intermediate position between the top and bottom of the sub tank body 51 gives the sub tank 33 an adequate gas capacity in substantially the top half thereof. A gas space having a volume of substantially half the sub tank body 51 absorbs pulsations in the functional liquid that occur on the upstream side. Specifically, the gas space acts as a so-called air damper that is capable of absorbing pulsations of the functional liquid. Transmission of pulsation downstream of the sub tank 33, particularly to the functional droplet discharge heads 9, can thereby be suppressed, and the occurrence of discharge defects in the functional droplet discharge heads 9 can be suppressed.

The liquid column pipe 53, which is a characteristic feature of the first embodiment, attached to the sub tank 33 will next be described in detail with reference to FIGS. 5 and 6.

In the liquid column pipe 53, a pipe body 59 attached to the sub tank body 51 communicates with the sub tank body 51 by an upper communicating part 61 and a lower communicating part 62, the abovementioned liquid level detection mechanism 64 is provided facing the pipe body 59, and a helical wire member 65 in the shape of a coil spring is inserted as a liquid guide portion into the pipe body 59. The pipe body 59 is made of a liquid-repellent (water-repellent) material, or the internal surface thereof is liquid repellent. Droplets therefore adhere to the internal surface of the pipe body 59 due to changes in liquid level or atmospheric aggregation.

The pipe body 59 is optically transparent (light transmissive) so that the liquid level detection mechanism 64 described above can sense the liquid level of the sub tank body 51 through the use of photosensors. The helical wire member 65 is inserted into the straight portion of the pipe body 59 across the position of the lower-limit detection sensor 58 from a position above the upper-limit detection sensor 56, and helically shaped gaps are expanded vertically so as to straddle the sensing positions of the photosensors. Specifically, the portions of the helical wire member 65 that are near the photosensors are positioned away from (apart from) the sensing positions. In this case the helical wire member 65 may be formed by molding a stainless steel or resin wire member in a helical shape according to the inside diameter of the pipe body 59, or a stainless steel or resin coil spring that fits the inside diameter of the pipe body 59 may be used as the helical wire member 65. For the actual helical wire member 65, a wire member having an outside diameter slightly larger than the inside diameter of the pipe body 59 may be wound up and set inside the pipe body 59. Since droplets of the functional liquid (or solvent) inside the pipe body 59 thereby flow downward along the helical wire member 65 and away from the sensing positions, erroneous detection by the photosensors can be prevented. When the sensing positions are changed, the alignment of the helical wire member 65 is, of course, correspondingly changed. When the helical wire member 65 is provided with a larger helical pitch (spacing of the helical shape), there may be no need to widen the portions thereof that are in the sensing positions (the same applies in the embodiments described hereinafter).

Liquid level sensing in the sub tank body 51 by the liquid level detection mechanism 64 that is provided facing the liquid column pipe 53 will be described with reference to FIG. 6.

As described above, the liquid level detection mechanism 64 includes an upper-limit detection sensor 56 for detecting the liquid level of the functional liquid at an upper limit; a liquid level detection sensor 57 for detecting the liquid level of the functional liquid during replenishing, the liquid level detection sensor 57 being provided in an intermediate position between the top and bottom; and a lower-limit detection sensor 58 for detecting the liquid level of the functional liquid at a lower limit. These sensors are photosensors for detecting the liquid level by the refractive index of light in the detection unit. In a photosensor including a light-emitting element and a light-receiving element, the light-receiving element receives the light emitted by the light-emitting element when the sensing position of the photosensor is in air, but when the sensing position is in liquid, the light emitted by the light-emitting element is radiated into the liquid, and since the refractive index of the light is different, the light-receiving element does not receive the light. The liquid level is sensed by the change in the output of the light-receiving element. The photosensor thus uses the characteristics of the light to sense the liquid level in the sub tank 33. However, when a droplet of functional liquid adheres to the sensing position in the internal surface of the liquid column pipe 53, the output of the light-receiving element changes in the same manner as when the liquid level is detected, due to radiation of the light into the droplet, and this change in output may be misinterpreted as detection of the liquid level. The liquid column pipe 53 of the first embodiment is therefore configured so that by inserting a helical wire member 65 into the pipe body 59, the droplet flows downward along the helical wire member 65 without adhering to the sensing position. Droplets therefore do not adhere on the optical axis of the light emitted from the light-emitting element of the photosensor, and detection errors can be prevented.

Figure 7:
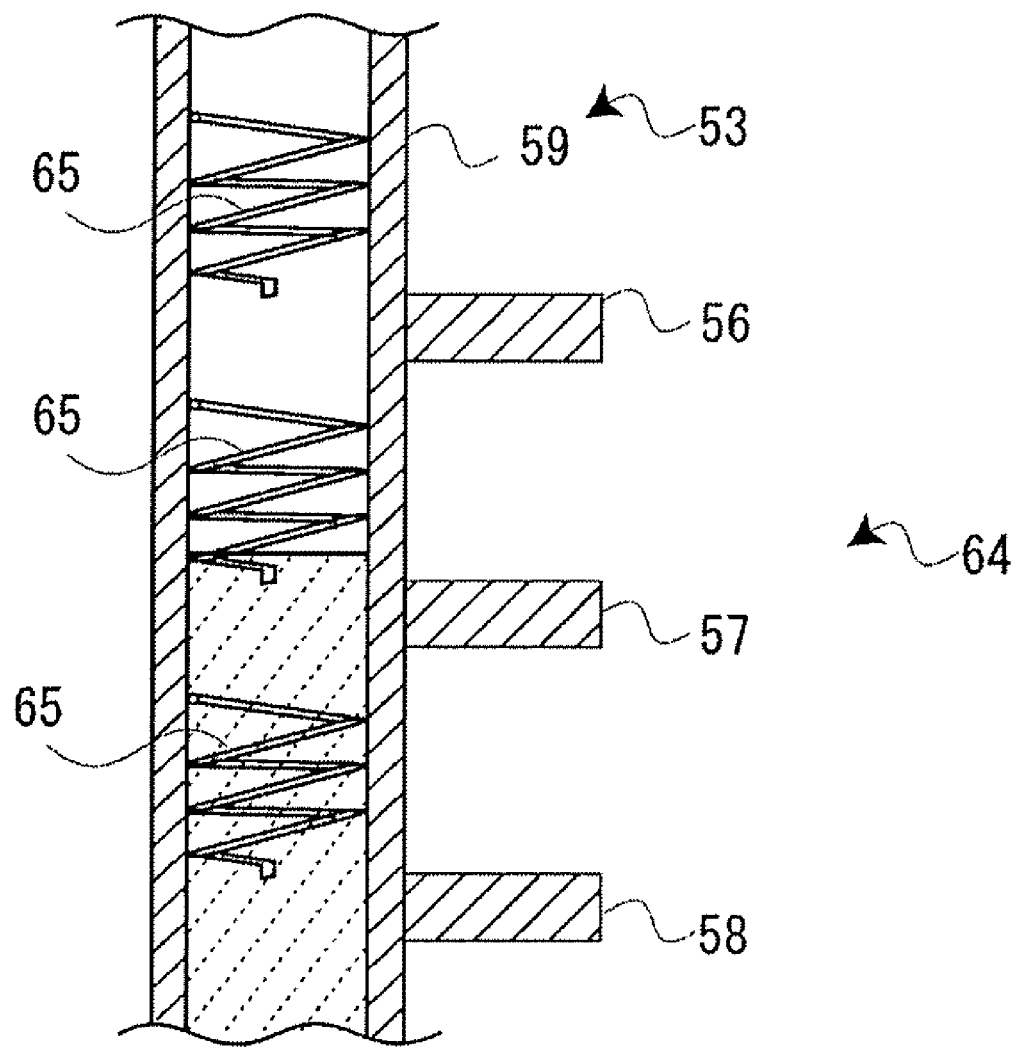
FIG. 7 is a schematic sectional view showing the liquid column pipe according to a modification of the first embodiment.

FIG. 7 shows the liquid column pipe 53 according to a modification of the first embodiment. In the present modification, a plurality (three in the drawing) of coil spring-shaped helical wire members 65 including wire members shorter than the helical wire member 65 in the first embodiment is inserted in the pipe body 59 in a position higher than the upper-limit detection sensor 56, in a position between the upper-limit detection sensor 56 and the liquid level detection sensor 57, and in a position between the liquid level detection sensor 57 and the lower-limit detection sensor 58. Specifically, the helical wire members 65 are provided outside the sensing positions of the photosensors in the liquid level detection mechanism 64. The helical wire members 65 are preferably arranged so that the bottom ends thereof are in the left or right position as viewed from the photosensor, and so that the bottom ends are bent vertically downward. Droplets can thereby be made to readily flow downward away from the sensing positions. Since the functional liquid that has formed droplets in the pipe body 59 flows downward along the plurality of helical wire members 65 in this case as well, droplets do not adhere on the optical axis of the light emitted from the light-emitting elements of the photosensors, and detection errors can be prevented.

Figure 8:
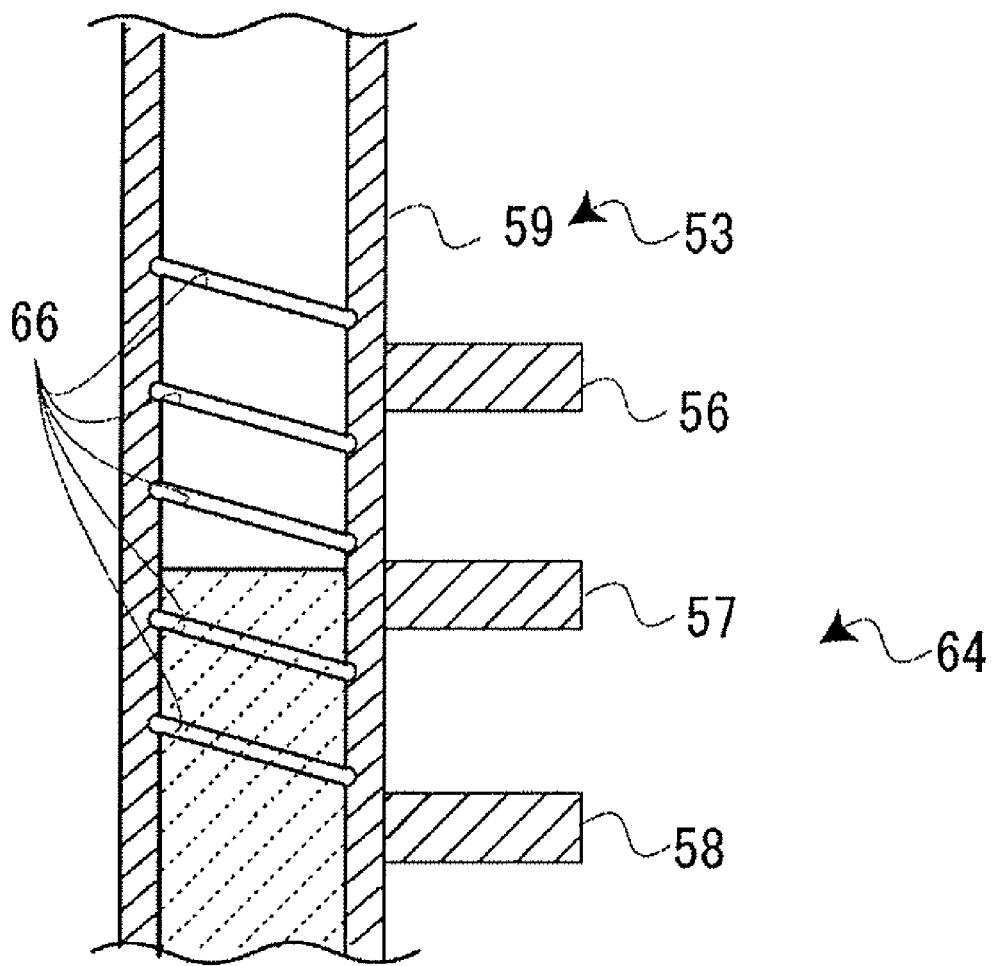
FIG. 8 is a schematic sectional view showing the liquid column pipe according to a second embodiment.

The liquid column pipe 53 according to a second embodiment will next be described with reference to FIG. 8. In order to avoid redundant description of aspects of the first embodiment, only the liquid guide portion in the liquid column pipe 53 will be described.

In the liquid column pipe 53, a pipe body 59 attached to the sub tank body 51 communicates with the sub tank body 51 via an upper communicating part 61 and a lower communicating part 62, the abovementioned liquid level detection mechanism 64 is provided facing the pipe body 59, and groove portions 66 having a liquid-guiding inclination are formed in a helical shape as liquid guide portions in the internal surface of the pipe body 59. The groove portions 66 are formed by grinding a helical shape into the internal surface of the pipe body 59, or are integrally molded in the pipe body 59, for example.

The groove portions 66 are formed in a helical shape avoiding the upper-limit detection sensor 56, the liquid level detection sensor 57, and the lower-limit detection sensor 58, in order to prevent droplets from adhering at the sensing positions of the photosensors. Since droplets that enter the groove portions 66 flow downward along the helical shape, droplets do not adhere on the optical axis of the light emitted from the light-emitting elements of the photosensors, and detection errors can be prevented. The groove portions 66 are continuous from top to bottom in the present embodiment, but three separate groove portions 66 may also be formed, as in the modification described above.

The liquid column pipe 53 according to a third embodiment will next be described with reference to FIG. 9. In order to avoid redundant description of aspects of the first and second embodiments, only the liquid guide portion in the liquid column pipe 53 will be described.

In the liquid column pipe 53, a pipe body 59 attached to the sub tank body 51 communicates with the sub tank body 51 via an upper communicating part 61 and a lower communicating part 62, the abovementioned liquid level detection mechanism 64 is provided facing the pipe body 59, and a plurality (three in FIG. 9) of protruding portions 67 having a liquid-guiding inclination are formed in a helical shape as liquid guide portions on the internal surface of the pipe body 59. In this case, the protruding portions 67 are formed by bonding or hot-pressing resin wire members in a helical shape to the internal surface of the pipe body 59, for example. The protruding portions 67 may also, of course, be integrally molded with the pipe body 59.

The plurality of protruding portions 67 is formed in a helical shape in a position above the upper-limit detection sensor 56, a position between the upper-limit detection sensor 56 and the liquid level detection sensor 57, and a position between the liquid level detection sensor 57 and the lower-limit detection sensor 58, avoiding the liquid level detection mechanism 64, in order to prevent droplets from adhering at the sensing positions of the photosensors. Specifically, the protruding portions 67 are provided outside the sensing positions of the photosensors in the liquid level detection mechanism 64. Since droplets flow downward along the helically shaped protruding portions 67, droplets do not adhere on the optical axis of the light emitted from the light-emitting elements of the photosensors, and detection errors can be prevented. A plurality of protruding portions 67 is formed in the present embodiment, but this configuration is not limiting insofar as a structure is adopted whereby droplets are prevented from adhering at the sensing positions of the photosensors, and the flow of droplets is guided. A single continuous protruding portion 67 may also be formed in a helical shape.

Through the configurations described above, erroneous detection of the liquid level of the functional liquid can be prevented by providing a helical wire member 65, groove portions 66, or protruding portions 67 as a liquid guide portion for the internal surface of the liquid column pipe 53. The amount of functional liquid inside the sub tank 33 can thereby be accurately monitored, and the appropriate liquid level can be maintained.

GENERAL INTERPRETATION OF TERMS

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Finally, terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A liquid column member of a liquid tank adapted to be coupled to a tank body of the liquid tank and to face a photosensor that detects a liquid level in the tank body, the liquid column member comprising:
    a pipe body made of light transmissive material, the pipe body having a liquid repellent internal surface; and
    a liquid guide portion configured and arranged to guide a droplet that slips down along the internal surface of the pipe body away from a sensing position of the photosensor.

2. The liquid column member of a liquid tank according to claim 1, wherein
    the liquid guide portion includes a groove portion formed in the internal surface of the pipe body so as to extend at a liquid-guiding inclination.

3. The liquid column member of a liquid tank according to claim 1, wherein
    the liquid guide portion includes a protruding portion formed on the internal surface of the pipe body so as to extend at a liquid-guiding inclination.

4. The liquid column member of a liquid tank according to claim 1, wherein
    the liquid guide portion includes a wire member attached to the internal surface of the pipe body so as to extend at a liquid-guiding inclination.

5. The liquid column member of a liquid tank according to claim 4, wherein
    the internal surface of the pipe body is cylindrical, and
    the wire member is a coil spring member.

6. A liquid tank comprising:
    the liquid column member according to claim 1;
    the tank body; and
    the photosensor facing the liquid column member.

7. A droplet discharge device comprising:
    a drawing unit configured and arranged to move an inkjet-type functional droplet discharge head relative to a workpiece, during which time droplets of a functional liquid are discharged from the functional droplet discharge head to the workpiece, so that drawing is performed; and
    the liquid tank according to claim 6 configured and arranged to store the functional liquid and to feed the functional liquid at the natural hydraulic head to the droplet discharge head.

* * * * *